March 2, 1926.

R. L. WALSH 1,575,084

ELECTRICAL AUXILIARY ARRANGEMENT

Filed Sept. 9, 1920   3 Sheets-Sheet 1

Inventor
Robert L. Walsh

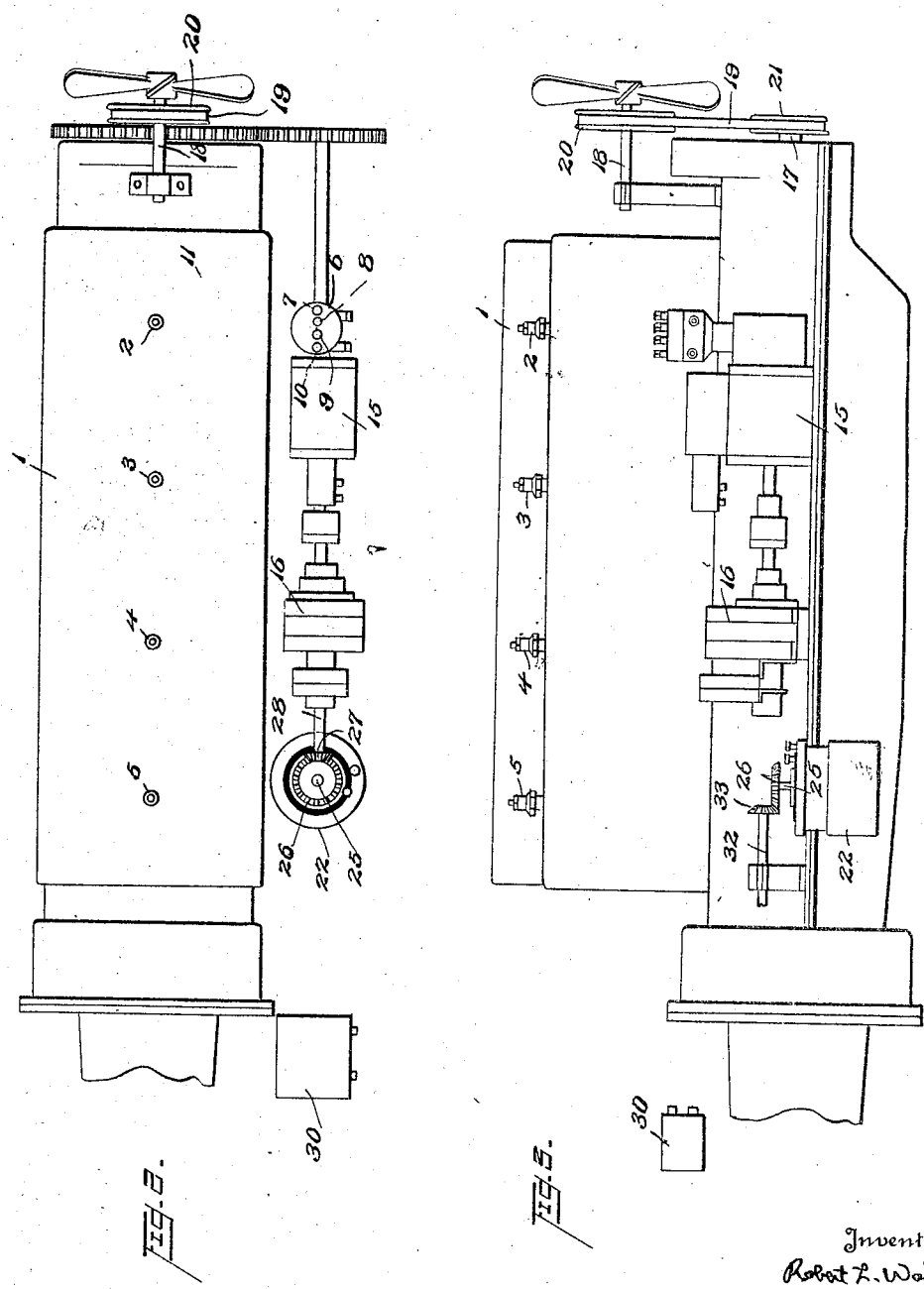

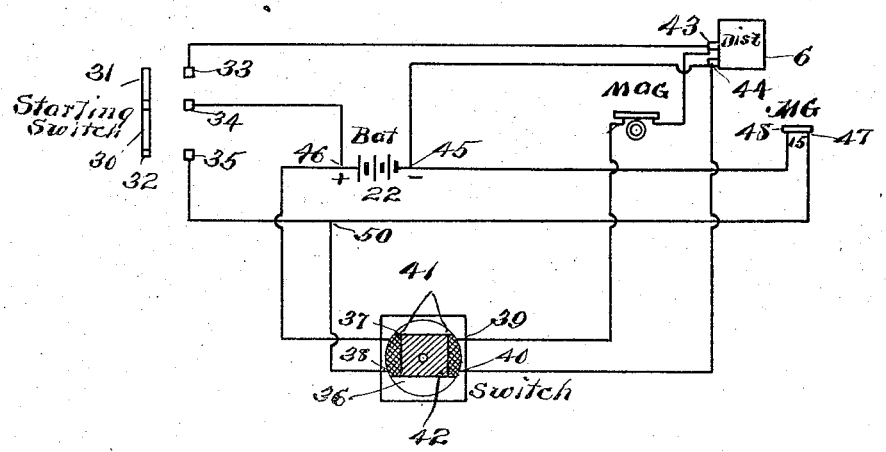

Patented Mar. 2, 1926.

1,575,084

UNITED STATES PATENT OFFICE.

ROBERT L. WALSH, OF WASHINGTON, DISTRICT OF COLUMBIA.

ELECTRICAL AUXILIARY ARRANGEMENT.

Application filed September 9, 1920. Serial No. 409,236.

*To all whom it may concern:*

Be it known that I, ROBERT L. WALSH, a citizen of the United States, residing at Washington, in the District of Columbia, have invented certain new and useful Improvements in Electrical Auxiliary Arrangements, of which the following is a specification.

This invention relates to an electrical auxiliary arrangement and has particular reference to an arrangement comprising a prime mover the actuating medium of which may be ignited or controlled in any manner by an electrical circuit or source of electrical current, or may be any other suitable prime mover. It comprises a storage battery, or set of storage batteries, a generator driven by the prime mover to charge such storage battery and means actuated by the prime mover for effecting relative movement between the electrodes and the electrolyte of the storage battery during the stages of charging and discharging.

In the various forms of my invention, depolarization of electrodes is performed effectively and particularly during the stage of charging whereby the efficiency of the system is greatly increased. By my invention, as I have discovered, the heating of the parts of the battery is materially reduced thus enabling the storage of a charge in excess of that of present and heretofore proposed batteries; also, affording the charging to full charge condition in a minimum period.

Further features and objects of the invention will be more fully understood from the following description and the accompanying drawings, in which:

Fig. 2 is a diagrammatic fragmentary plan view of the same.

Fig. 3 is a side elevation, similar to Fig. 1, of a modification.

Fig. 4 is a diagram of the circuit connections employed.

Figure 1:
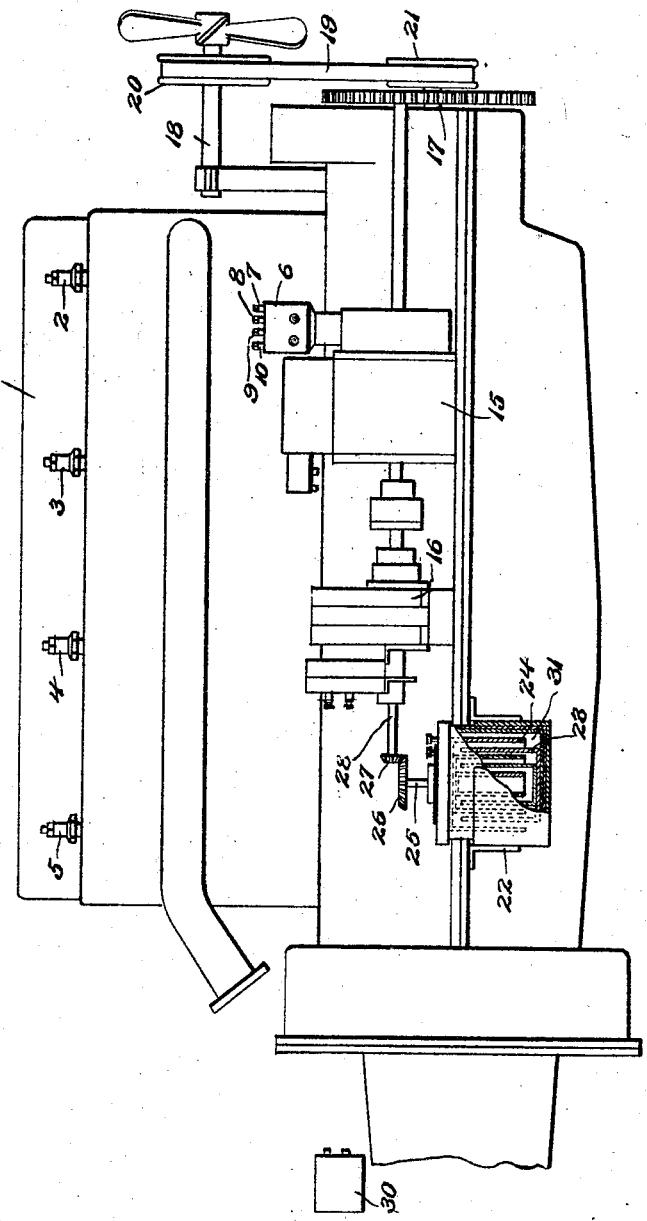
Fig. 1 is a side elevation, largely diagrammatic, of an approved type of internal combustion engine suitable for operating an automobile.

Referring to Figs. 1 and 2, the engine 1 is indicated as of the automotive type of internal explosive energy, and, for example, comprising four cylinders whose spar plugs are indicated at 2, 3, 4, and 5. The distributor 6 is of any approved type and comprises a corresponding number of terminals 7, 8, 9, 10, adapted to be connected by leads (not shown) to the respective spark plugs 2, 3, 4, 5.

In the illustrated embodiment characterizing this invention, there is shown a motor-generator and magneto 15 and 16 of standard construction. The shaft of the motor-generator 15 is coupled with shaft 18 of the magneto and the two units are operated from the engine shaft by means of meshing gears 17, one of which is keyed to an extension of the motor generator shaft.

The storage battery, or set of storage batteries, is indicated at 22 and comprises a set of electrodes 23, 23 of one polarity and a set of electrodes 24, 24 of the opposite polarity, the latter set being mounted to rotate relatively to the set of electrodes 23—23 under the drive of the shaft 25, driven by the gears 26 and 27, the latter being mounted on the magneto shaft 28.

Certain preferred forms of construction of my storage battery and means for effecting relative movement between the electrodes and the electrolyte thereof, are disclosed and claimed in my co-pending applications Serial No. 363,798 filed March 6, 1920, and entitled "Secondary or storage batteries"; also, Serial No. 409,234 filed Sept. 9, 1920, and entitled "Self-charging system", and Serial No. 409, 235 filed Sept. 9, 1920, and entitled "Self-charging system".

Although any desirable system of electrical distribution may be employed in connection with this invention for starting, operating the explosive engine, and charging the storage battery, the preferred system is diagrammatically shown in Fig. 4 and comprises with battery 22, motor-generator 15, magneto 16, distributor 6, a starting switch 30 and auxiliary switch 36, the former embodying suitable insulated blades 31, 32, cooperating with contacts 33, 34, and 35, and the latter involving four contacts 37, 38, 39 and 40, adapted to be bridged by insulated segments 41 carried by the manually controlled rotor 42.

With reference to starting switch 30, contact 33 is connected to one terminal 43 of the distributor, the other terminal, thereof, 44 being connected at 45 to battery 22; contact 34 is connected at 46 to the battery 22, while contact 35 is connected to one terminal 47 of the motor-generator 15, the other terminal 48 being connected to the battery 22.

In regard to the auxiliary switch 36; contact 37 is connected to the battery circuit at 49; contact 38 at 50; contact 39 at 51 to one terminal of the magneto, the other terminal thereof, being connected to 43 of the distributor; contact 40 to terminal 44 of the distributor 6.

In view of the preceding it will be apparent when blades 31 and 32 of the starting switch are placed in engagement with contacts 33, 34, and 35, a circuit will be established as follows: battery 22, 46, 34, blade 31, 33, 43, 44, 45, to supply the necessary current for ignition purposes. Likewise another circuit will be established as follows: battery 22, 46, 34, blade 32, 35, 47, 48, to the battery to operate the motor for starting purposes.

After the engine has been started the rotor of auxiliary switch 36 is actuated to place segments 41 in bridging relation with respect to contacts 37 and 38, 39 and 40. With the contacts of the auxiliary switch in this position, the motor-generator is now functioning as a generator to charge battery 22 as follows: generator terminal 48 to 45 and battery 22, and from battery 22 to 46, 49, 37, segment 41, 38 and 50 to terminal 47. Concomitant with the completion of the generator circuit the magneto is connected to the distributor as follows: terminal 51 of the magneto, contact 39, segment 41, 40 to terminal 44 of the distributor, the other terminal thereof, 43, being connected to terminal 52 of the magneto.

When the starting switch 30 is operated to start the engine, the shaft of the motor generator 15 rotates the set of electrodes through the medium 24 relative to electrodes 23 shaft 25 and mitering gears 26 and 27. This movement of electrodes 25 produces circulation of the electrolyte whereby under the discharging conditions the maximum available energy of the storage battery is utilized for operating the motor and starting the engine.

When the engine has been started, and the motor-generator 15 is functioning to replenish battery 22, displacement of electrodes relative to the electrolyte, enables current of relatively high amperages to be delivered and effectively stored therein, and also reduces the transmission and polarizing losses. My invention, accordingly, affords the use of a generator of less ampere-turns and correspondingly less weight and a storage battery of relatively less total plate surface area for a given rating of engine; or the generative parts and the storage battery of the prevailing capacities and dimensions may be employed and greater reliability of operation insured for a consumption circuit of even greater wattage.

The modification as shown in Fig. 3 is similar to that of Figs. 1 and 2, excepting that the storage battery 22 is driven by the engine shaft through the auxiliary shaft 32, provided with a gear 33 meshing with the gear 26 on the shaft 25 of the storage battery 22, whereby, similarly as hereinafter described, under operation of the engine 1 as the prime mover, current is supplied to the storage battery 22 by the generator 15 under the condition of rotation of the set of electrodes 24 relative to the electrolyte 31 and the other set of electrodes 23. The motor-generator 15 and magneto 16 may be operated in the same manner as shown in Figures 1 and 2 of the drawings.

In the above specific embodiments, an explosive engine is indicated as the prime mover, but it is apparent that any other type of prime mover or motive unit may be employed, such as a steam engine and the storage battery utilized for any type of consumption circuit such as lighting or heating or the like, and not necessarily including an ignition circuit.

What I claim is:

In combination with an electric starter motor generator means for an engine, a storage battery for said motor generator means, means to effect a depolarization of said storage battery, an engine coupled to said starter motor generator means, and further means whereby said depolarization means and said motor generator are simultaneously actuated at starting by the battery.

In testimony whereof I affix my signature.

ROBERT L. WALSH.